United States Patent

[11] 3,603,609

| | | |
|---|---|---|
| [72] | Inventors | Ion V. K. Hott;<br>Robert J. Haddix, both of Dayton, Ohio |
| [21] | Appl. No. | 823,018 |
| [22] | Filed | May 8, 1969 |
| [45] | Patented | Sept. 7, 1971 |
| [73] | Assignee | The Joyce-Cridland Company<br>Dayton, Ohio |

[54] COMBINATION STANDING AND SITTING STRUCTURE
9 Claims, 4 Drawing Figs.

[52] U.S. Cl............................................. 280/62,
180/25 R, 248/429, 29/65 R, 297/195
[51] Int. Cl............................................. B60n 1/02
[50] Field of Search............................................. 180/25, 26,
27; 296/65; 248/21, 29; 297/195, 314

[56] References Cited
UNITED STATES PATENTS

| 2,724,599 | 11/1955 | Knapp............................ | 180/27 X |
| 2,771,145 | 11/1956 | Peters............................ | 180/26 |
| 3,099,326 | 7/1963 | Weigel............................ | 180/26 |

FOREIGN PATENTS

| 549,637 | 11/1922 | France............................ | 180/22 |
| 1,399,461 | 4/1965 | France............................ | 296/65 |

*Primary Examiner*—Benjamin Hersh
*Assistant Examiner*—John A. Pekar
*Attorney*—Walter Becker ABSTRACT: A vehicle having at least three wheels is provided with a frame base including an upwardly inclined forward portion and a substantially flat rearward platform portion to which a Y-shaped tubular support is secured by only three fasteners. A beam is carried intermediately upon the tubular support and has a track readily slidable on the beam. A seat resiliently mounted on the track is readily slidable back and forth on the beam for alternately sitting on the seat to impart tilt with frictional interengagement of the track and beam to prevent sliding movement therebetween and standing on the platform without troublesome release of seat bolts with a wrench or tools.

PATENTED SEP 7 1971
3,603,609
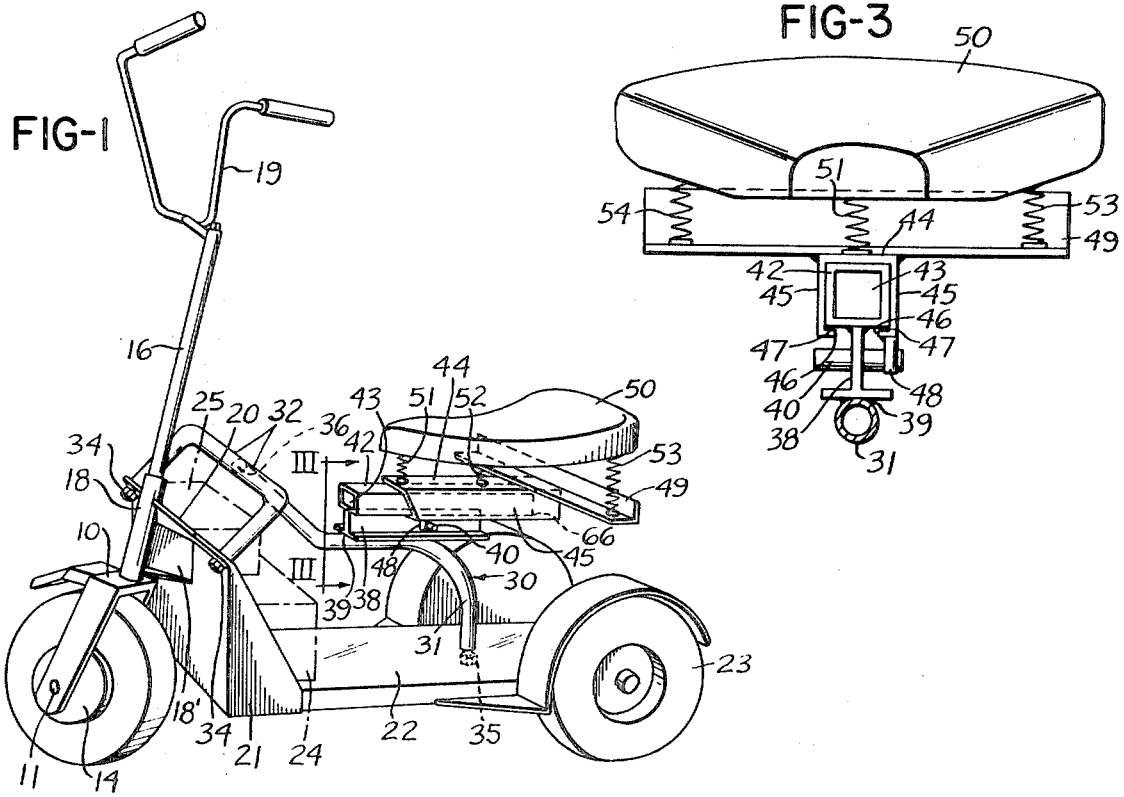
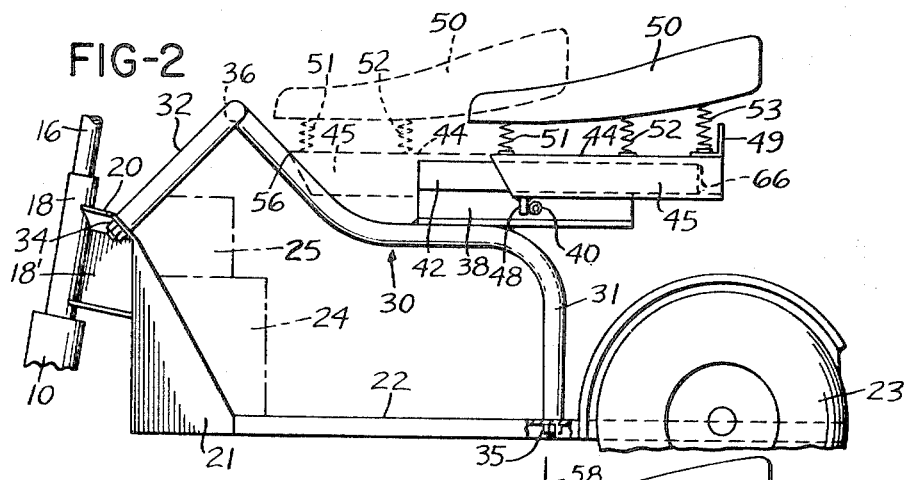
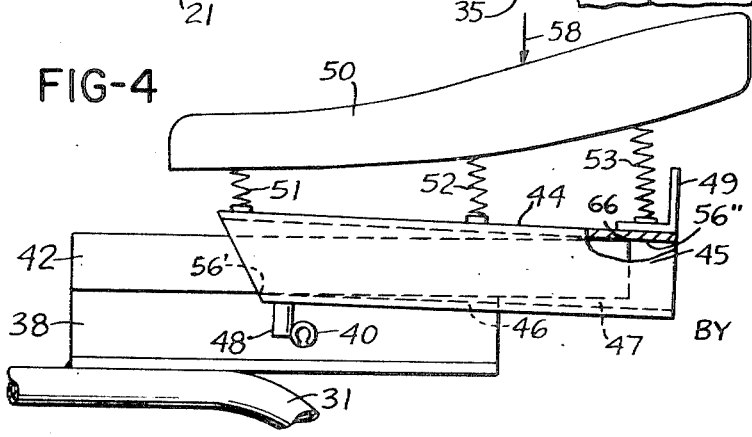
INVENTORS
ION V.K. HOTT
ROBERT J. HADDIX
BY 3,603,609

COMBINATION STANDING AND SITTING STRUCTURE

This invention relates to a combination standing and sitting structure particularly useful on wheeled lightweight vehicles which are used in a factory, warehouse or other location where an operator needs mobility and versatility during operation of the vehicle. The combination standing and sitting structure of this invention represents an improvement applicable to an engine-driven scooter of a type disclosed by our copending U.S. Pat. applications Ser. No. 692,411, now U.S. Pat. No. 3,512,599 and Ser. No. 692,412 now U.S. Pat. No. 3,506,080 both filed Dec. 21, 1967. Also the combination standing and sitting structure is usable for scooter-type vehicles as disclosed by U.S. Pat. application Ser. No. 612,960 filed Jan. 31, 1967. now U.S. Pat. No. 3,447,623. An object of this invention is to provide a scooter or vehicle frame having a platform in combination with a readily slidable seat which permits an operator quickly to alternate between standing and sitting positions on the vehicle.

A further object of this invention is to provide a slidable seat assembly including girder structure or mating beam support and track for a spring-supported seat to be moved back and forth easily to permit an operator alternatively to stand up or sit down without troublesome release of bolts with any wrench or tools.

Still another object of this invention is to provide a tubular frame structure having a bifurcated tubular mounting at one end complementary to an upwardly extending portion of a platform and at an opposite end having a single tubular end secured to a flat platform portion substantially parallel to and below an I-beam secured to an intermediate location of the tubular frame and adapted to support a seat slidably mounted within predetermined limits thereon. More particularly, the I-beam structure includes a box-shaped upper portion embraced on substantially three sides thereof by a channel-forming track secured to at least three springs which are fitted complementary between the track and a cross piece thereof with respect to a substantially triangular-shaped seat. Weight of an occupant in the seat toward a rearward located spring results in binding of the track and box-shaped I-beam portion into its frictional engagement at the front and rear of the track upon tilting of the seat during spring biasing against the weight of an occupant in the seat.

Further objects and advantages of the present invention will be apparent from the following description, reference being made to the accompanying drawing in which preferred embodiments of the present invention are clearly shown. The drawings are as follows:

FIG. 1 shows a motorized scooter or three-wheeled vehicle having combination standing and sitting structure with features in accordance with the present invention.

FIG. 2 is an enlarged fragmentary elevational view showing alternate seat portions for the combination standing and sitting structure of FIG. 1.

FIG. 3 is a partially sectioned elevational view taken along line III—III in FIG. 1 of the drawings.

FIG. 4 shows the frictional binding of a track and box-shaped I-beam portion during seat tilting under weight of an occupant for the combination standing and sitting structure of this invention.

A scooter or vehicle is made readily usable by an operator who can alternate between standing and sitting positions relative to support structure having a minimum longitudinal distance and provided with a lightweight tubular structure. The tubular structure is formed in a generally Y-shaped configuration which includes a single elbow-bent tubular member connected at one end to an intermediate location of a U-shaped portion welded into a rigid juncture. Three fastening means such as bolts are sufficient to secure the tubular structure at the one tubular end and at the opposite U-shaped ends respectively into a mounting position upon a frame or body having an upwardly bent forward platform portion and a rearwardly extending flat standing platform rear portion integrally therewith. A forward lower half portion of an I-beam support is welded to an intermediate location of the single tubular structure and has a free end extending rearwardly in a cantilever manner substantially parallel to the rear platform standing portion. A channel or track complementary to an upper box-shaped portion of the I-beam structure is adapted to permit longitudinal sliding movement of the track relative to the I-beam structure. The channel or track includes a transverse portion collectively forming therewith a T-shaped configuration relative to which at least three and preferably four springs are mounted including two springs in alignment with the track or channel and two more springs in alignment with the transverse portion of the track. A substantially triangular seat is carried on springs secured between the seat and track or channel and transverse structure. A stop or abutment projects downwardly from a forward end of the track or channel on at least one side thereof and this stop or abutment is complementary to or engageable with a laterally extending pin, stud or projection secured to at least one side of the I-beam structure. The track or channel has sufficient clearance with respect to the box-shaped portion of the I-beam structure to permit easy sliding movement when the seat is unoccupied.

When an occupant places his weight on the seat a tilting movement occurs between the track or channel relative to the box-shaped portion of the I-beam structure such that sufficient frictional tilting engagement occurs to apply an offcenter force through the seat and springs to the channel or track which is maintained in a fixed engagement with the box-shaped portion of the I-beam structure. When an occupant stands up and removes his weight from the seat, the latter is readily slidable into a forward position out of the way to facilitate standing of the operator on the platform toward the rear thereof where the platform is substantially parallel to the I-beam structure, channel or track and seat arrangement.

The foregoing structure specifically involves a minimum number of parts which are of light weight and inexpensive to assemble. The Y-shaped general tubular support configuration is readily interchangeable from one scooter to another by use of only three fastening means or bolts and/or nuts for ease of assembly and disassembly with respect to a scooter or vehicle.

Referring more particularly to the detail structure of FIG. 1, there is shown a vehicle or scooter of a three-wheel type including a front fork 10 or bifurcated member relative to which an axle or shaft 11 is mounted for journaling a wheel 12 having a brake 14 operatively associated therewith in a well-known manner. The fork or bifurcated member 10 is secured to a lower end of a shaft 16 turnable relative to a tubular support 18 and having substantially U-shaped handle bar means 19 operatively carried thereon. The tubular support 18 is held together with a web 18' suitably welded to a forward platform portion 20 which extends at an incline or in a slanted position rearwardly from the tubular support 18. This platform portion 20 forms one end of a frame of the scooter or vehicle having a sidewall portion 21 and a rearwardly extending horizontal flat portion 22 which forms a rear platform upon which an occupant can stand between a pair of rear wheels 23. The sidewall portion 21 provides a convenient receptacle or retainer for a battery means 24 or other engine driving mechanism used to power the vehicle preferably by a suitable transmission or chain drive to front or rear wheels of the vehicle. Reference can be made to the previously noted copending applications for an example of drive mechanism of either electric motor or gasoline-powered engine means usable with the scooter or vehicle. A charger or recharging device 25 can be mounted on top of the battery or engine energizer 24 if an electric drive mechanism is provided with the vehicle.

In accordance with the present invention, a tubular frame structure generally indicated by 30 is provided for mounting on the platform of the scooter or vehicle. This tubular structure 30 includes an angular rear tubular portion 31 forming a generally Y-shape with a bifurcated or forked forward portion 32 having a U-shaped configuration alone. The U-shaped forward bifurcated portion 32 extends downwardly and forwardly so that opposite free ends thereof can have suitable bolts or nuts 34 threaded thereto to hold the bifurcated tubular portion 32 directly on the forward platform portion 20. A single rear fastening means or bolt and nut assembly 35 holds the rear downwardly extending end of the tubular portion 31 directly to the flat rear platform portion 22 of the scooter or vehicle. The three bolts or nuts 34, 35 are readily accessible for quick assembly and disassembly of the tubular frame structure 31, 32 with respect to the platform portions of the scooter or vehicle. A forward end of the elbow-shaped tubular portion 31 is joined by welding for example at an intermediate juncture 36 to the U-shaped forward tubular portion 32.

An intermediate horizontal portion of the tubular member 31 is substantially parallel to the rear platform portion 22.

A forward lower half of an I-beam structure 38 is welded at 39 to the intermediate horizontal portion of the tubular member 31.

The I-beam structure has a pin, lug, or transverse projection 40 press fitted transversely through a central web of the I-beam structure. The projection can be press fitted or welded to the web of the I-beam structure. A box-shaped upper portion 42 having a hollow interior 43 is carried on top of the I-beam structure centrally of the web. The box-shaped portion 42 is also parallel to and horizontal with respect to the intermediate portion of the tubular member 31 and rear platform portion 22 respectively. The box-shaped portion 42 is longer than the I-beam structure 38. Preferably, the front ends of the box-shaped portion and I-beam structure are flush with each other and the rear cantilever extension of the box-shaped portion 42 projects beyond the I-beam structure welded only to the forward major portion of the box-shaped portion 42. A channel guide or track 44 includes side portions 45 parallel to each other and complementary to the box-shaped portion 42. The channel or track 44 and the downwardly extending side portion 45 also have opposite inwardly bent flanges 46 complementary to an underside of the box-shaped portion 42 as best seen in FIG. 3 of the drawings. A gap or clearance 47 exists between the flanges 46 and the underside of the box-shaped portion 42 as is evident particularly in the views of FIGS. 3 and 4 of the drawings. A stop or downwardly extending abutment 48 is adapted to engage the transverse lug or projection 40 on at least the side of the I-beam structure 38 thereby limiting rearward movement of the track or channel 44. A transverse angle iron or crossmember 49 is suitably secured such as by welding to a rear end of the top of the track or channel 44.

A seat 50 having a substantially angular shape fits above the channel or track 44 and cross member 49. Spring means 51, 52, 53 and 54 interconnect the seat with the track or channel 44. The springs 51 and 52 are longitudinally spaced from each other and in alignment with the channel or track 44 whereas the springs 53 and 54 are located outboard or at laterally opposite ends of the transverse member 49.

In FIG. 1 the seat 50 is shown with the track 44 being in a slidable position rearwardly as far as possible. In FIG. 2 the full-line representation of seat 50 corresponds to the position of the seat in FIG. 1. A forward phantom showing of the seat 50 with the springs 51, 52 and channel or track 44 including side portions 45 can be seen as a result of representation of forward sliding of the seat 50. A rearwardly slanted edge 56 of the track 44 and side portions 45 can provide an abutment or limiting stop relative to an upwardly bent front end of the tubular portion 31 as represented in FIG. 2 of the drawings.

When the seat 50 is readily slid into a forward position there is sufficient leg and knee room for an operator to stand on the rear platform portion 22. When the seat is slide rearwardly or in any location intermediate the complete rear and complete forward positions, the operator can seat himself or have his weight occupy the seat and this weight is represented by an arrow 58 as an offcenter force exerted downwardly on the seat. This offcenter downward force represented by arrow 58 is transmitted through the springs 51, 52, 53 and 54 in such a way that the channel or track 44 occupies a slightly tilted position and the side portions 45 and lower flanges 46 have a parallel and boxed relationship to the box-shaped portion 42 forming frictional bind at a front edge 56', internally at a rear inner surface 56" with a rear edge 66 of the box-shaped portion 42.

The combination standing and sitting structure of the present invention carries no troublesome release of bolts with a wrench or tools for adjusting the seat 50 and, more particularly, the track or channel 44 including the side portions 45 relative to the box-shaped portion 42. The seat 50 with the track 44 and transverse member 49 in a T-shaped configuration can be readily caused to slide forward so that an operator is able to stand on a rear platform portion 22 parallel to the seat track and square tubing or box-shaped portion 42. It is to be noted also that the readily slidable seat support structure is such that quick compensation is provided for an operator having longer or shorter arms to facilitate reaching the handle bar means 19. The Y-shaped tubular support structure 30, 31, 32 provides a strong and rigid support for the slidable seat in combination with the horizontal rear platform portion 22.

It is to be understood that while the present disclosure shows a preferred embodiment of the present invention, modifications thereof can be made in accordance with the teaching of the present invention as defined by the scope of the appended claims.

We claim:

1. A combination standing and sitting structure for a vehicle having at least three wheels, comprising: a vehicle frame base including an upwardly inclined forward portion and a substantially flat rearward horizontal platform portion for standing thereon, a generally Y-shaped support correspondingly joined to said base forward inclined and rearward platform portions respectively and having an intermediate portion, said Y-shaped support being tubular throughout including said intermediate portion which is horizontally parallel to said platform portion, a beam carried on said intermediate portion of said Y-shaped support, a channel-shaped track member in complementary readily sliding engagement with said beam, a seat resiliently carried on said channel-shaped track member freely movable forwardly and rearwardly when said seat is unoccupied, said seat when occupied being held in position against sliding prevented by frictional engagement between said channel-shaped track member and said beam, said beam being substantially I-shaped and welded along lower surface thereof to said tubular intermediate portion, and a box-shaped upper portion on said beam along which said channel-shaped track member is slidable.

2. A combination standing and sitting structure according to claim 1, in which only three fastening means anchor extremities of said Y-shaped support to said base forward inclined and rearward platform portions respectively.

3. A combination standing and sitting structure according to claim 1, in which said box-shaped upper portion is squared tubing welded onto said beam, said beam for substantially half length thereof being welded to said intermediate portion of said tubular support an said squared tubing being longer than said beam though welded to said beam for a major length distance of said squared tubing that extends rearwardly in a cantilever manner.

4. A combination standing and sitting structure according to claim 1, in which a transverse portion is carried on said channel-shaped track member and forms a T-shaped configuration therewith, and at least three springs being secured collectively between said seat and said track member with said transverse portion.

5. A combination standing and sitting structure according to claim 4, in which there is a total of four springs including two between said seat and said track member and two between said seat and said transverse portion, said seat when occupied having a downward force thereon to impart a slight tilt of said track member with respect to said box-shaped upper portion of said beam for frictional bind to hold said seat stable against sliding movement and readily releasing said seat when unoccupied for sliding movement forwardly to facilitate standing on said platform portion.

6. A combination standing and sitting structure according to claim 5, in which said track member has downwardly extending side portions and inwardly extending flanges respectively extending toward each other from said side portions, said track member including said side portions and said flanges having a sufficient clearance gap with respect to said box-shaped upper portion of said beam for said tilt to be possible.

7. A combination standing and sitting structure according to claim 6, in which an abutment projects downwardly from one of said flanges, and a stop extends laterally from at least one side of said beam, said abutment being engageable with said stop to limit rearward sliding movement.

8. A combination standing and sitting structure according to claim 7, in which said track member has an inclined edge at a forward end thereof engageable with said tubular support to limit forward sliding movement.

9. An adjustable sitting structure and support combination for use on a vehicle having at least three wheels and having a vehicle-frame base including a forward portion as well as a rearward portion, improvement therewith which comprises: a generally Y-shaped support having three-point connection separably and correspondingly connectable to the base forward portion and to the base rearward portion respectively and having an intermediate portion, said Y-shaped support being tubular throughout including said intermediate portion, a beam carried on said intermediate portion of said Y-shaped support, a channel-shaped track member in complementary readily sliding engagement with said beam, a set resiliently carried on said channel-shaped track member freely movable forwardly and rearwardly when said seat is unoccupied, said seat when occupied being held in position against sliding prevented by frictional engagement between said channel-shaped track member and said beam, said beam being substantially I-shaped and secured along a lower surface thereof to said intermediate tubular member, a box-shaped upper portion on said beam along which said channel-shaped track member is slidable, a transverse portion carried on said channel-shaped track member and forming a T-shaped configuration therewith, and at least three springs being secured collectively between said seat and said track member with said transverse portion.